J. J. LAWLER.
THERMOSTATIC HEAT CONTROLLING REGULATOR.
APPLICATION FILED MAR. 12, 1919.

1,415,584.

Patented May 9, 1922.

2 SHEETS—SHEET 1.

Inventor
J. J. Lawler
By N. M. Wilson
Attorney

J. J. LAWLER.
THERMOSTATIC HEAT CONTROLLING REGULATOR.
APPLICATION FILED MAR. 12, 1919.

1,415,584.

Patented May 9, 1922.
2 SHEETS—SHEET 2.

Inventor
J. J. Lawler
By N. M. Wilson
Attorney

UNITED STATES PATENT OFFICE.

JAMES J. LAWLER, OF PELHAM, NEW YORK.

THERMOSTATIC HEAT-CONTROLLING REGULATOR.

1,415,584.  Specification of Letters Patent.  Patented May 9, 1922.

Application filed March 12, 1919. Serial No. 282,075.

*To all whom it may concern:*

Be it known that I, JAMES J. LAWLER, a citizen of the United States of America, residing at Pelham, in the county of Westchester and State of New York, have invented certain new and useful Improvements in Thermostatic Heat-Controlling Regulators, of which the following is a specification.

The primary object of the invention is the provision of an automatic control for shifting members such as valves operable by variations in the temperature of the atmosphere surrounding and entering the device.

A further object of the invention is to provide thermostatic controlling means for valves, such as those employed for controlling the flow in steam, water and gas radiators whereby the temperature is uniformly maintained at a predetermined degree by the regulation of the flow of heating medium.

A still further object of the invention is to provide a thermostatic regulator for controlling heat, rendering the heating problem of buildings more economical as well as sanitary by insuring uniform temperature, the invention being simple in construction eliminating the use of electricity, hydraulic power or thermometers as well as any special pipe lines, the invention being readily installed upon any heat radiator for permanent use in connection therewith.

With these general objects in view, the invention consists of the novel combination and arrangement of parts hereinafter fully described, illustrated in the accompanying drawings and then claimed.

Figure 1:
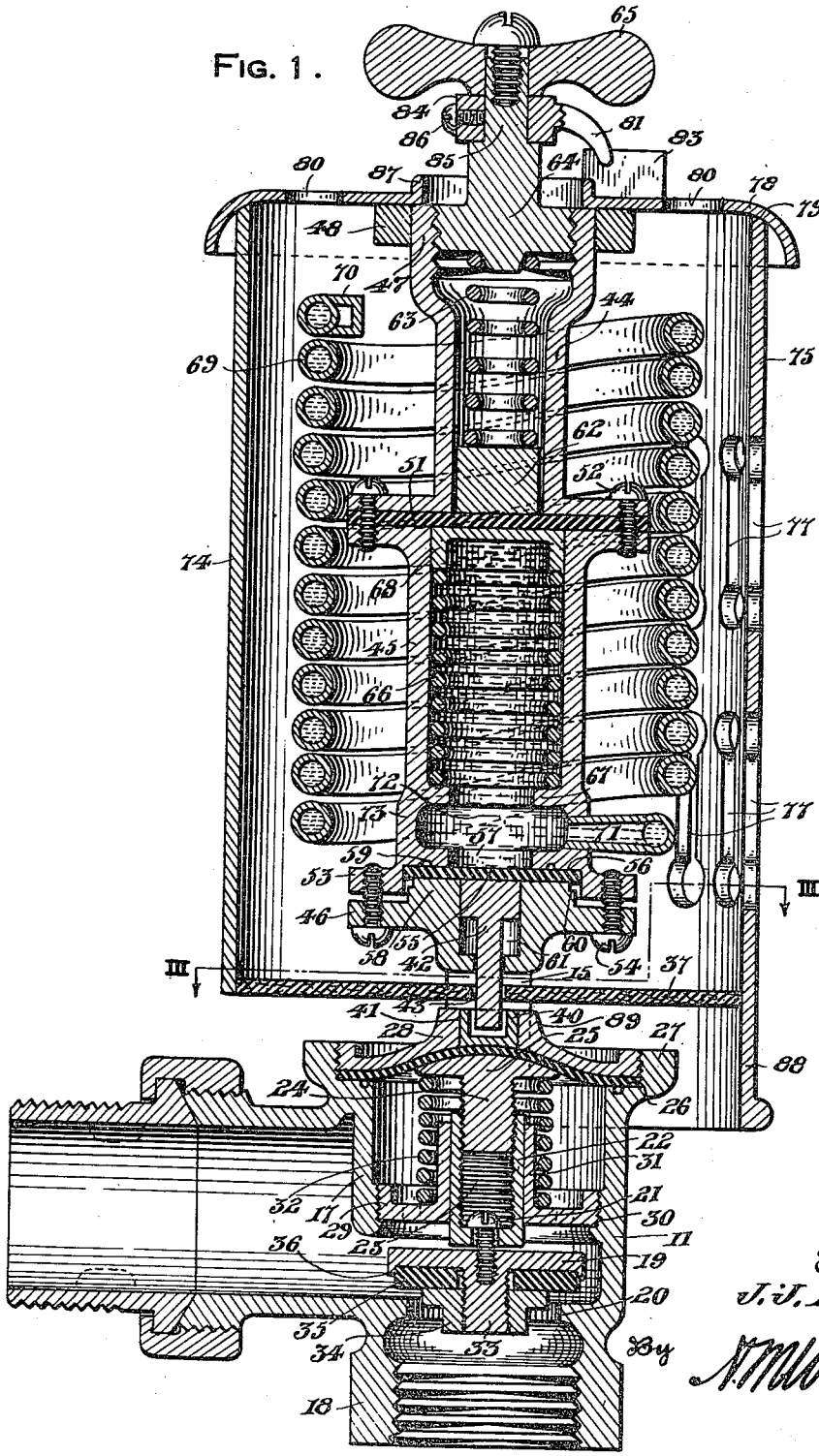
Figure 4:
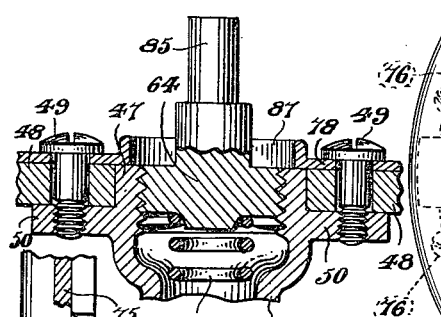
Figure 2:
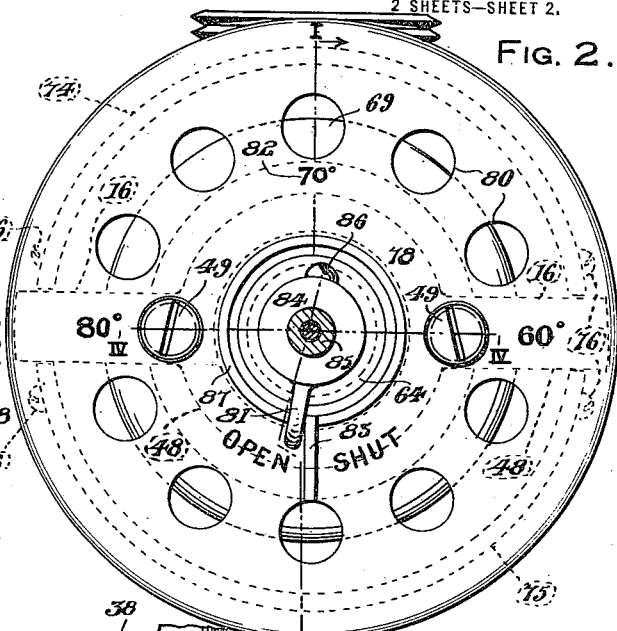
Figure 5:
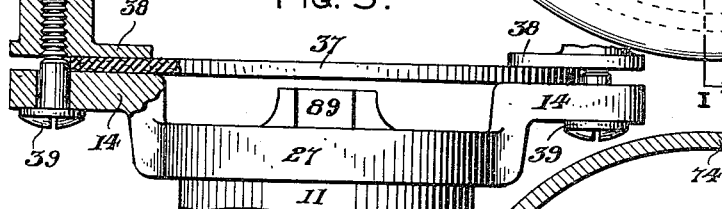
Figure 6:
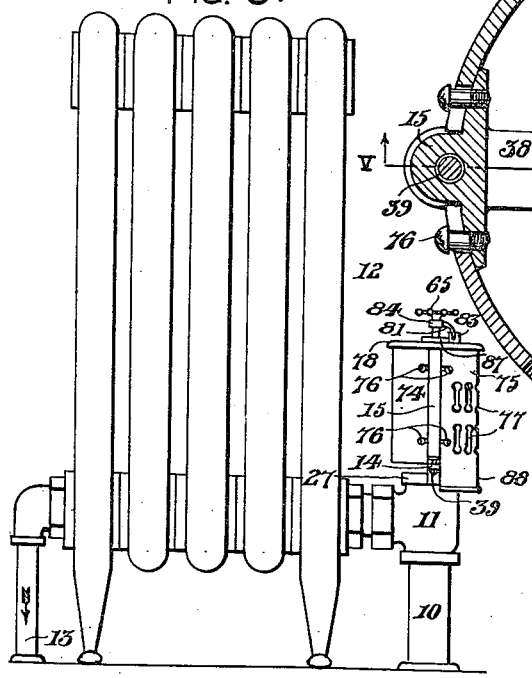
Figure 3:
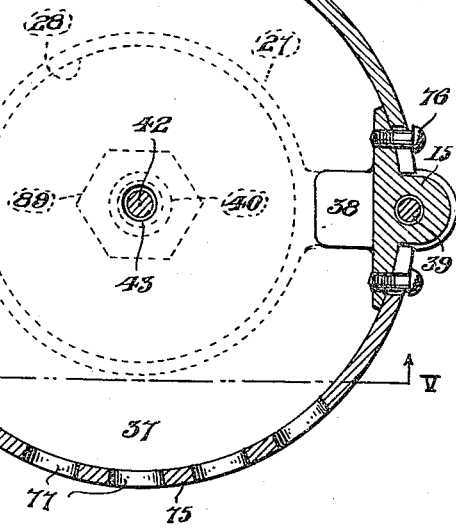

In the drawings, like reference characters designate corresponding parts throughout the several views, and Figure 1 is a central vertical sectional view through the invention and a radiator valve connection upon which the same is installed, taken substantially upon line I—I of Figure 2, Figure 2 is a top plan view thereof, parts being shown in transverse horizontal section, Figure 3 is a horizontal transverse sectional view taken upon line III—III of Fig. 1, Figure 4 is a vertical detail sectional view upon line IV—IV of Figure 2 with parts removed, Figure 5 is a similar sectional view upon line V—V of Figure 3, and Figure 6 is an illustrative view indicating the position of the invention installed upon the inlet valve of a heat radiator.

My invention is primarily designed for the automatic control of the heating fluid such as water or steam passing from an inlet service pipe 10 through a valve casing 11 to a radiator 12 having an outlet pipe 13. The valve casing 11 of the radiator is provided with oppositely projecting offset arms 14 upon which an arch member is mounted, the arch member consisting of side posts 15 and a cross piece 16 at the top thereof, as shown in Figures 2 and 4. A tubular depending portion 17 of the valve casing 11 is in axial alinement with the connecting end 18 of the casing attached to the adjacent end of the pipe 10 when operatively positioned. A reciprocating valve 19 controls the valve seat 20 in the casing 11 and is swivelly mounted by means of a screw 21 depending from a slidable plug 22 having an internal threaded bore 23 adjustably receiving the stem 24 of a mushroom-shaped follower 25.

A flexible diaphragm 26 of such material as rubber is seated within an annular flange 27 upon the top of the casing 11, the diaphragm flatly overlying the follower 25 with a cover plate 28 for the casing 11 securely threaded in the flange 27. A cage member 29 is threaded as at 30 within the tubular member 17 with the plug 22 slidably mounted in a tubular portion 31 of the cage while an opening spring 32 for the valve 19 is seated upon the cage 20 and beneath the follower 25 normally tending to maintain the valve 19 elevated off of its seat 20 with the diaphragm 26 flatly engaging the cover plate 28. The valve 19 may be of any desired form, the same being illustrated as having a centrally depending threaded stem 33 with a washer 34 threaded thereon for maintaining a packing 35 on the stem within an annular flange 36 on the underside of the valve 19, thus forming a cushion valve to engage the valve seat 20.

A heat and moisture insulator in the form of a fibre disk 37 is interposed between the arms 14 and the bottoms of the posts 15, as shown in Figures 1 and 5 inwardly projecting feet 38 upon said posts bearing upon the top of the disk 37 while screws 39 extend through the arms 14 for reception in threaded sockets formed in the lower ends of the posts 15. A cup 40 is centrally seated upon the diaphragm 26 and is slidable within a central bore 41 of the cover plate 28 and is adapted to be depressed by an actuator 42 extending through a central perforation 43 in the disk 37 with its lower end maintained within the cup 40, this construction being more clearly shown in Figure 1.

A supporting column is axially suspended above the cup 40 and valve 19 by the cross member or head 16 and is formed in two main parts or sections, an upper section 44 and a lower section 45, while a bottom member or cap 46 upon the lower section 45 adjustably supports the actuator 42. The upper section 44 is tubular with a neck 47 maintained within a central ring 48 of the cross head 16 by means of screws 49 extending through the ring 48 and threaded into radial lugs 50 upon the neck 47.

The lower section 45 is also tubular being of slightly greater diameter than the upper section 44 and having a flexible diaphragm 51 of material such as rubber secured between the two sections 44 and 45 by means of cooperating flanges upon the adjacent ends of the sections secured together by screws 52. The cap 46 is secured to a flange 53 upon the lower end of the section 45 by means of screws 54 and has a flexible diaphragm 55 maintained within a recess 56 surrounding the central opening 57 at the lower end of the section 45 and within which recess an annular portion 58 of the cap 46 projects in contact with the diaphragm 55. An annular groove 59 in the wall of the recess 56 and a shoulder 60 upon the cap portion 58 permit portions of the diaphragm 55 to be forced into said grooves when the diaphragm is operatively positioned for maintaining the peripheral portions thereof against shifting although permitting flexing movement of the central portion of the diaphragm 55 to operate the actuator 42.

The actuator 42 is slidably mounted in a socket 61 of the cap 46, the diaphragm 55 closing the upper end of the socket 61 normally contacting the upper end of the actuator 42, it being evident that downward flexing of the diaphragm 55 lowers the actuator 42 into contact with the cup 40 for depressing the diaphragm 26, follower 25 and plug 22 for lowering the valve 19 upon its seat 20. A plug 62 within the section 44 is mounted upon the diaphragm 51 while a spring 63 positioned upon the plug 62 is engaged at its upper end by a regulating screw 64 threaded in the neck 47 of the section 44 with a suitable handle 65 fixed upon the upper end of the screw. A helical spring 66 within the lower section 45 rests upon an annular shoulder 67 in said section while a head 68 upon the spring 66 is normally maintained by said spring in contact with the diaphragm 51.

A thermostatic coil 69 formed of suitable piping surrounds the sections 44 and 45 with the upper end of the coil suitably closed as at 70, while the lower end of the coil 69 has a portion 71 tapped into the chambered interior 72 of the slightly enlarged lower end 73 of the column section 45. A casing is provided for the thermostatic regulating means for protecting the same and preventing undue heating from the adjacent radiator and consists of semicircular plates 74 and 75 secured to the posts 15 by screws 76 at the sides of the device. The heat insulating disk 37 closely fits within the lower end of the casing plates 74 and 75 substantially preventing any heat from the valve casing 11 entering the thermostat casing, the forward wall 75 of the casing, however, being suitably slotted as at 77 permit the atmosphere of the room to enter the casing and contact the coil 69. A cap 78 is secured upon the cross head 16 by the aforementioned screws 49, the cap 78 resting upon the bevelled upper edges 79 of the side sections 74 and 75 while perforations 80 for the passage of air are provided through the cap 78.

Suitable fluid fills the coil 69 and the lower column section 45, such fluid being non-freezing and capable of expanding and contracting during the relative rising and lowering of the temperature of the surrounding atmosphere which enters the casing 74—75. Any suitable non-freezing solution such as those commonly employed in automobile radiators may be employed if desired, it being essential that coil 69 and section 45 be completely filled with the thermostatic fluid to the absolute exclusion of all air and when so constructed, the perfect operation of my invention is insured for all temperatures or climatic conditions. The screw 64 is turned by means of the handle 65 to position an indicating finger 81 at any temperature graduation upon the cap 78 as desired, such, for instance, as 70° indicated at 82 in Figure 2 of the drawings. A lug 83 upon the cap 78 may be engaged by the finger 81 and at such times, the valve 19 is opened to its widest extent, while the turning of the screw 64 for downward movement positions the finger 81 against the opposite side of the lug 83 and at such times the valve 19 is closed. The finger 81 is set to indicate the desired normal temperature at which the room is to be automatically maintained by the thermostatic device in its control of the valve 19 and the further operation thereof will now be described.

The spring 32 normally maintains the valve 19 open to its fullest extent and the threaded connection of the plug 22 upon the follower stem 24 regulates the length of travel of the valve. The position of the actuator 42 with respect to the operating cup 40 may be changed by turning the handle 65, lowering the screw 64, plug 62, diaphragm 51 and head 68, the movement of which parts compresses the fluid within the lower section 45 but depresses the diaphragm 55 and the actuator 42. The thermostatic means of the invention is tested and adjusted before the device leaves the factory so that the temperature graduations 82 upon the cap 78 are substantially correct. When installing my automatic regulator in connection with a radiator in any location, however, it may be found necessary to slightly correct such adjustment and for this reason, the finger 81 is carried by a collar 84 secured in adjusted position upon the stem 85 of the screw 64 by means of a set screw 86.

When desired to normally maintain the temperature of the room at any degree such as 70°, the finger 81 will be shifted to the desired graduation which is arranged so as to place the actuator 42 with the valve 19 to admit the required amount of heat to the radiator to maintain the room at a temperature of 70°. The fluid within the lower section 45 fills the space between the diaphragm 55 and head 68 and changes the position of said head, an increase in temperature of the fluid in the section 45 and the coil 69 lowers the diaphragm 55, actuator 42 and valve 19 when the temperature of the room rises above 70° so that an automatic reduction in the supply of heating fluid through the valve casing 11 is effected. When the temperature in the room falls below 70°, the fluid in the coil 69 and lower section 45 contracts, permitting the spring 32 to elevate the follower 25 and plug 22 for opening the valve 19 to the required degree. When an equilibrium is reached by a return of the temperature in the room to 70°, the thermostatic fluid assumes the same temperature with a consequent automatic adjustment of the valve 19. The invention is ornamental in appearance, a finishing bead 87 being preferably provided centrally of the cap 78 surrounding the screw stem 85. The front wall 75 of the regulator casing has a depending portion 88 beneath the level of the disk 37 to prevent heat from the pipe 10 and valve casing 11 from passing through the openings 77 but causing the same to pass rearwardly beneath the heat insulating disk 37 forming the bottom of the casing. The cover plate 28 preferably provides polygonal surfaces 89 for convenience in threading the plate 28 into the flange 27. From this detailed description of the invention, the complete operation thereof will be fully understood and minor changes may be made therein without departing from the spirit and scope of the invention as claimed.

What I claim as new is:—

1. A regulator for a valve comprising a tubular column, a downwardly projecting actuator slidably carried by the column and operatively associated with the valve, a thermostatic coil surrounding the column and communicating with the interior of the column for automatically operating the actuator during a change of temperature, means arranged exteriorly of said column and resiliently associated therewith for adjusting the internal capacity of said column whereby the actuator is initially positioned as desired, and means within the tubular column cooperating with the capacity adjusting means to hold the same under tension.

2. A device of the class described comprising a tubular column containing expansible fluid, a diaphragm closing each end of the column, a coil communicating with the interior of the column and filled with expansible fluid, a valve actuator operatively engaging one of said diaphragms to be operated by said diaphragm upon a change in temperature of said fluid, means resiliently associated with the column for adjusting the internal capacity of said column whereby the actuator is initially positioned as desired, and means within the tubular column cooperating with the capacity adjusting means to hold the same under tension.

3. In combination with a valve casing, having a resiliently mounted valve therein, an actuator for the valve shiftably positioned above the valve, a cap in which said actuator is mounted, a tubular section upon said cap containing expansible fluid, a fluid containing coil surrounding said section communicating with the interior thereof, the said actuator being shifted upon a change in temperature of said fluid within the coil and tubular section, a diaphragm upon the tubular section opposite said actuator, manually controlled means resiliently engaging the outer side of the diaphragm to flex the diaphragm for changing the normal position of the actuator, and means within the tubular section for holding the diaphragm in its normal position when unaffected by the diaphragm engaging means.

4. In combination with a valve, an actuator therefor, a cap in which said actuator is slidably mounted, a diaphragm upon said cap contacting said actuator, a tubular section upon said cap having its lower end contacting said diaphragm, a pipe coil communicating with the interior of said section, expansible fluid filling said section and coil for changing the position of said actuator upon expansion of the fluid, a diaphragm closing the upper end of the tubular section, means for holding the upper diaphragm at its limit of outward movement, a plug upon the outer side of the upper diaphragm, a spring upon said plug, and an adjusting screw in contact with said spring for moving said plug and diaphragm to vary the internal capacity of the tubular section and coil.

In testimony whereof I affix my signature.

JAMES J. LAWLER.